June 19, 1962 — J. A. DOBROWOLSKI — 3,039,362
NARROW BAND INTERFERENCE FILTER
Filed May 9, 1958

Inventor
J. A. Dobrowolski
Attorneys

United States Patent Office 3,039,362
Patented June 19, 1962

3,039,362
NARROW BAND INTERFERENCE FILTER
Jerzy Adam Dobrowolski, Ottawa, Ontario, Canada, assignor to National Research Council, Ottawa, Ontario, Canada, a corporation of Canada
Filed May 9, 1958, Ser. No. 734,295
2 Claims. (Cl. 88—106)

This invention relates to light filters, more particularly to filters of the interference type. Interference filters have been known (Geffcken, German Patent No. 716,154) consisting of two highly reflecting layer systems (which may be single metallic films, or assemblies of dielectric layers) separated by a spacer layer the optical thickness of which is an integral number, $p$, of half wavelengths. This type of filter has, however, one disadvantage. Owing to the inhomogeneity and the scattering within the spacer layer, the narrowest pass bands that may be obtained in this way have a half-width of 15–20 A. Hereafter, half-width shall be referred to as H.W., and shall mean the distance measured in A. units between the two points on the transmission wavelength curve, at which the intensity is half of the peak intensity.

The H.W. of an interference filter is given by the approximate expression $$\text{H.W. (in A.)} = \frac{2}{\pi\sqrt{m}} \times \frac{\lambda}{p} \quad \text{Equation 1}$$

where $\lambda$ is the wavelength at the peak of transmission and $$m = \frac{4R}{(1-R)^2}$$

where $R$ is the intensity reflection coefficient of one of the reflecting layers. It will be seen that the H.W. may be reduced by one of two ways: (i) by increasing $m$, that is, by increasing $R$, (ii) by increasing $p$, the order of interference.

The first approach has been suggested by Turner in his United States Patent No. 2,601,806 in which a very high reflection is obtained through the use of the principle of frustrated total reflection. However, in a subsequent paper, (Turner, "Les propriétés Optiques des Lames Minces Solides," Centre National de la Recherche Scientifique, Paris 1950, p. 140), the author of the above patent explained that the theoretically expected narrow H.W. could not be obtained in practice owing to inhomogenieties of the spacer layer.

The second approach was suggested by Weinstein, ("Astronomical Optics and Related Subjects," p. 409, North Holland Publishing Co., Amsterdam, 1956), who proposed that a thick spacer layer of ZnS be evaporated, but this approach would also suffer from the same difficulties.

The object of the subject invention is to provide an interference filter which can be made with any desired H.W., but more especially with a very narrow H.W., the performance of which compares favourably with the only practical filter existing hitherto, namely, the Lyot polarization filter, which gives very narrow transmission bands. (See Dollfus, Revue Optique 35, p. 539 (1956).)

Another object is to achieve the above with a substantial gain in the transmission over the Lyot filter.

The way in which these objects may be achieved by the present invention will now be described.

The method employs the second of the two approaches listed above. A high order of interference is achieved not by evaporating a thick spacer layer of some dielectric, but by using a thin sheet of mica or similar material as a spacer. The reason for doing this is that mica can be cleaved into thin parallel sided flakes, and if special care is taken over the selections of the mica and in the process of cleaving, these flakes are sufficiently free of optical blemishes and cleavage steps over areas of several square inches. Such sheets of mica can be used for the construction of narrow band interference filters, and since they are homogeneous and uniform the difficulties mentioned above are not encountered.

A system of highly reflecting layers is then evaporated onto each side of the mica sheet. These may be single metallic layers, or some system of dielectric layers.

Reference will now be made to the accompanying drawings wherein.

Figure 1:
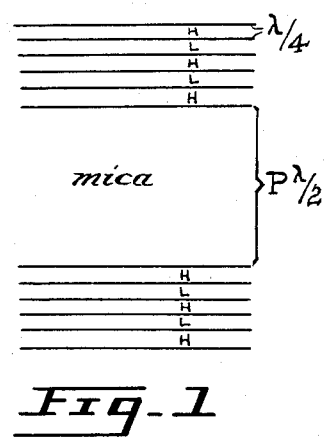
FIG. 1 is a cross section of a mica filter; with conventional highly reflecting dielectric layer systems.

Referring now in detail to the drawings, FIG. 1 shows a cross section through a mica filter with the conventional type of highly reflecting dielectric layer system in which the optical thicknesses of all evaporated layers is $\lambda/4$ and where alternate layers are of a high (H) and low (L) index material. The thickness of the mica spacer is $p.\lambda/2$.

It is well known that the wavelength at which the peak of transmission of the filter occurs depends on the angle of incidence of the light on the filter. Normally mica sheets, although their thickness may be uniform, will not be flat. This means that if no special precautions are taken, the wavelength of the transmitted light varies over the area of the filter owing to different angles of incidence. In an attempt to overcome this problem, the inventor experimented with the mica filter cemented onto a flat piece of glass. This experiment did not prove to be successful.

Figure 2:
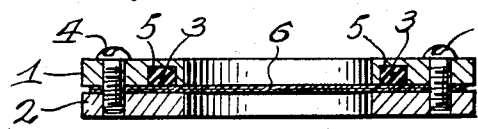
FIG. 2 is a cross section of the novel filter mount.

However, a satisfactory solution was evolved, using flat rings. A cross section of the special mount is illustrated in FIG. 2 wherein reference numerals 1 and 2 indicate two annular flat rings turned from any suitable material. A standard O-ring 3 is fitted into groove 5 in ring 1. A mica filter is mounted between the rings 1 and 2, and a plurality of fasteners 4 distributed around the circumference of the rings clamp rings 1 and 2 together. As the fasteners 4 are tightened the O-ring 3 is compressed against the filter 6, and the diameter of the circle of contact of the O-ring against the filter 6 increases. The mica filter 6 is thus stretched flat.

The material of which rings 1 and 2 are turned is so chosen, that its coefficient of linear expansion is as close as possible to that of the mica. Then the filter will stay flat over a large temperature range. One such suitable material is brass.

If a parallel beam of light is passed through a filter mounted in the above way and the transmitted light is examined with a spectrograph, two sets of a large number of narrow transmission lines would, in general, be seen. The reason for the large number of transmission lines is that the condition for a peak of transmission, $$2nt \cos i \approx p\lambda \quad \text{Equation 2}$$

Figure 3:
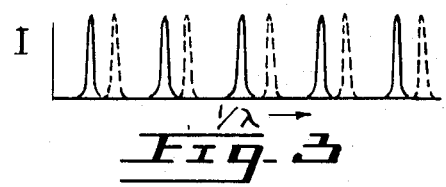
FIGS. 3 to 6 are intensity-wave number curves of mica filters during various stages of construction and for different applications.

(where $n$ is the refractive index, and $t$ the metric thickness of the mica sheet, $i$ is the angle of refraction of the light in the filter) is satisfied for a large number of wavelengths in the visible spectrum. If the intensity is plotted against $1/\lambda$, the separation between successive transmission peaks will be the same, as illustrated in FIG. 3.

The reason why, in general, two sets of transmission bands are seen is that mica is birefringent, and therefore the refractive index has different values for light polarized parallel to and perpendicular to the optic axis of the mica. The two systems of transmission bands will coincide only if the thickness of the mica is such that the retardation between the two polarized beams of light is $\lambda/2$ or a multiple thereof. Either one of the two sets of transmission bands can be removed with a polarizer.

To make a transmission band fit a certain wavelength, it may be necessary to evaporate onto the mica, before applying the highly reflecting layers, a thin film of up to $\lambda/2$ in optical thickness of a material the index of which is substantially the same as that of mica. For a typical case, where the spacing between subsequent transmission bands is about 30 A., this need be done with a precision of about $1/30$ of an order, for a 3 A. H.W.

Figure 4:
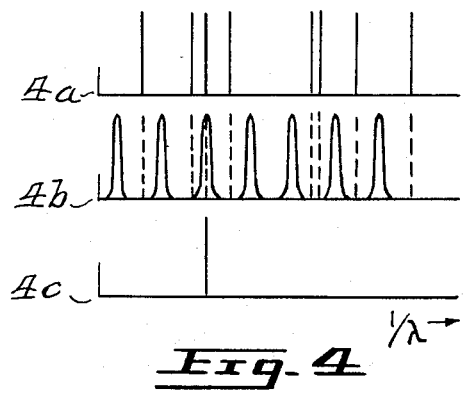

Mica interference filters may be used in one of three different ways. In the first application, where it is desired to isolate close lines in a line spectrum, the order of interference is so chosen, that all but the desired line fall sufficiently far from a transmission band so that only the desired line is transmitted. The action of such a filter is illustrated in FIG. 4, where are shown the line spectrum 4a, the position of transmission bands 4b, and the transmitted line 4c. Such a filter will be useful whenever the structure of a line is to be examined, or when light from one particular line is to be isolated for any reason.

Figure 5:
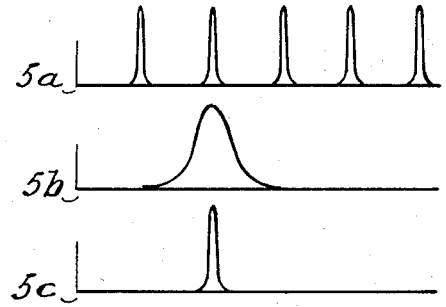

In another method of application, the filter is used with white light. To produce a single transmission band it is necessary to use a conventional all-dielectric interference filter. FIG. 5 shows the transmission of the mica filter 5a, the transmission of the ordinary interference filter 5b, and the combined transmission 5c.

Figure 6:
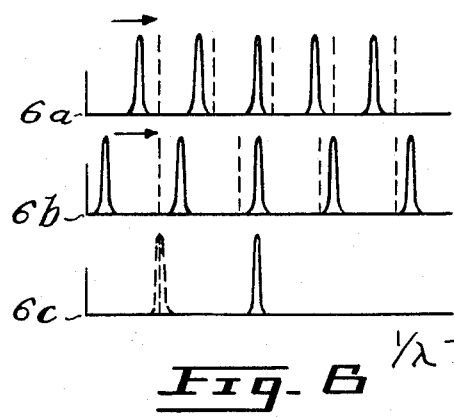
Figure 7:
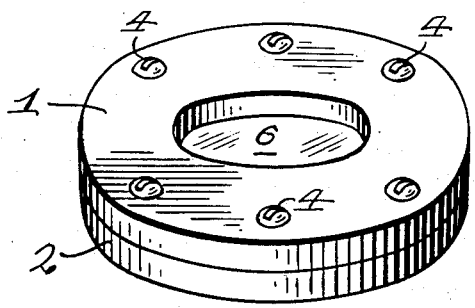
FIG. 7 is a perspective view of the filter illustrated in cross section in FIG. 1.

Finally, if the angular field required is not very large, it is possible to construct a filter which can be continuously adjusted over a wide part of the spectrum. In such a filter two of the above described mica filters are used, with slightly different separations between transmission bands. Thus, when the transmission bands of the two filters, shown in FIG. 6 at 6a and 6b, coincide at one particular wavelength, the following 10 or more transmission bands on either side will not coincide, and only one transmission band is seen through the filter combination illustrated at 6c. It is possible, by tilting both filters through small angles, to obtain a transmission band in a large part of the spectrum, as indicated in FIG. 6.

The theoretical performance of a typical mica filter which has a 100th order transmission band at a wavelength $\lambda = 5000$, and which uses highly reflecting coatings for which $R = .94$, is: 50 percent transmission of all the light of that wavelength incident upon it, and an H.W., calculated from Equation 1, of 1 A.

One experimental filter according to the invention had a transmission of 35% and H.W. of 2 A. instead of the theoretically predicted 50% and 1.2 A. The loss in transmission was due to the finite absorption of the mica. When more transparent mica is carefully selected these figures can be expected to be improved.

The description and explanation given above are by way of example and illustration only and the invention should be limited only by the scope of the appended claims.

I claim:

1. An interference filter of the dielectric layer type comprising in combination a spacer layer of a thin flake of mica of uniform thickness, said thickness being an increased integral multiple of a half wavelength to provide bandwidth reduction, said layer having dielectric layers of high and low index material evaporated on opposite sides thereof, said spacer layer and said dielectric layers being mounted between two flat annular rings, one of said rings having an annular groove on the side next to said spacer layer and said evaporated layers and an O-ring compressed within said groove against said spacer layer and said evaporated layers for stretching and flattening the spacer layer, said annular flat rings having a coefficient of linear expansion approximating the coefficient of linear expansion of mica, whereby the spacer layer remains stretched under varying conditions of temperature.

2. An interference filter according to claim 1 wherein said annular, flat rings are composed of mica.

References Cited in the file of this patent
UNITED STATES PATENTS

| | | |
|---|---|---|
| 2,522,531 | Mochel | Sept. 19, 1950 |
| 2,570,273 | Pryor | Oct. 9, 1951 |

FOREIGN PATENTS

| | | |
|---|---|---|
| 699,467 | Great Britain | Nov. 11, 1953 |

OTHER REFERENCES

"Some Notes on a New Type of Filter," article in British Journal of Photography, Kemp, June 17, 1949, page 276.

"Optical Properties of Thin Solid Films," textbook published in London, England, 1955, Heavens, page 228.